(12) United States Patent
Chuang

(10) Patent No.: US 6,309,109 B1
(45) Date of Patent: Oct. 30, 2001

(54) BEARING ASSEMBLY

(76) Inventor: William Chuang, No. 32, Kon-Shing St., Shulin, Taipei Hsien (TW)

(*) Notice: Subject to any disclaimer, the term of this patent is extended or adjusted under 35 U.S.C. 154(b) by 0 days.

(21) Appl. No.: 09/456,673

(22) Filed: Dec. 9, 1999

(51) Int. Cl.[7] .................................................. F16C 19/08
(52) U.S. Cl. ........................ 384/537; 384/499; 384/504; 384/506; 384/547
(58) Field of Search .................... 384/499, 502, 384/504, 505, 506, 517, 537–542, 543–547

(56) References Cited

U.S. PATENT DOCUMENTS

| | | | | |
|---|---|---|---|---|
| 554,004 | * | 2/1896 | Pontious | 384/544 |
| 2,230,857 | * | 2/1941 | Atlee | 384/506 X |
| 2,761,271 | * | 9/1956 | Spicacci | 384/506 X |
| 3,214,224 | * | 10/1965 | Lash | 384/517 |
| 5,183,342 | * | 2/1993 | Daiber et al. | 384/475 |
| 5,944,429 | * | 8/1999 | Berry | 384/506 |

* cited by examiner

*Primary Examiner*—Thomas R. Hannon
(74) *Attorney, Agent, or Firm*—Thomas, Kayden, Horstemeyer & Risley LLP

(57) ABSTRACT

A bearing assembly with at least one row of balls is disclosed. The bearing assembly has a shaft tube, at least one pair of bearing covers pressed onto the shaft tube, a concave surface formed in facing sides of each of the bearing covers, a row of balls received in the corresponding concave surfaces of the pair of bearing covers and a race arranged on the outer periphery of the row of balls to receive them. The bearing assembly can be arranged with multiple rows of balls to improve the ability to bear a large load between the rotating and stationary members.

2 Claims, 6 Drawing Sheets

BEARING ASSEMBLY

BACKGROUND OF THE INVENTION

1. Field of the Invention

The present invention relates to a bearing assembly, and more particularly to a bearing assembly with multiple rows of balls mounted therein to bear a heavier load.

2. Description of Related Art

Referring to FIG. 8, a ball bearing in accordance with the prior art comprises a bearing cover (40), a positioning collar (44), multiple balls (46) and a bearing race (42). The positioning collar (44) is co-axially mounted on the bearing cover (40). A row of balls (46) is located between the bearing cover (40) and the positioning collar (44) in a bearing race (42), such that the race (46) can rotate relative to the bearing cover (40) and the positioning collar (44) with very little friction. However, because the ability to bear a load depends on the number of rows of balls (46), the conventional bearing with a single row of balls (46) is not able to bear a large load between the rotating and stationary members. In addition, the conventional bearing is difficult to manufacture and assemble because the structure of the bearing cover (40) is complex.

Referring to FIG. 9, a bearing with two rows of balls (54) in accordance with the prior art comprises a tubular member (50) and a sleeve (52) mounted on the outer periphery of the tubular member (50). A row of balls (54) is received between the tubular member (50) and the sleeve (52) on each end of the sleeve (52), and a holder (56) is mounted to abut each row of balls (54) to maintain their position. The sleeve (52) can rotate relative to the tubular member (50) with little friction, and a bearing with two rows of balls (54) is achieved.

However, although the conventional bearing with two rows of balls (54) can bear a heavier load better than that of the conventional bearing with a single row of balls, the conventional bearing with two rows of balls (54) still lacks the ability to bear a very large load. In addition, there is no supporting effect between the rows of balls (54) when they are a long distance apart.

To overcome the shortcomings, the present invention tends to provide an improved bearing assembly to mitigate or obviate the aforementioned problems.

SUMMARY OF THE INVENTION

The main objective of the invention is to provide a bearing assembly with a shaft tube, at least one pair of bearing covers with a row of balls between the covers and a race so that the bearing assembly can be arranged with multiple rows of balls to improve the ability to bear a large load.

Other objects, advantages and novel features of the invention will become more apparent from the following detailed description when taken in conjunction with the accompanying drawings.

DETAILED DESCRIPTION OF PREFERRED EMBODIMENT

Figure 1:
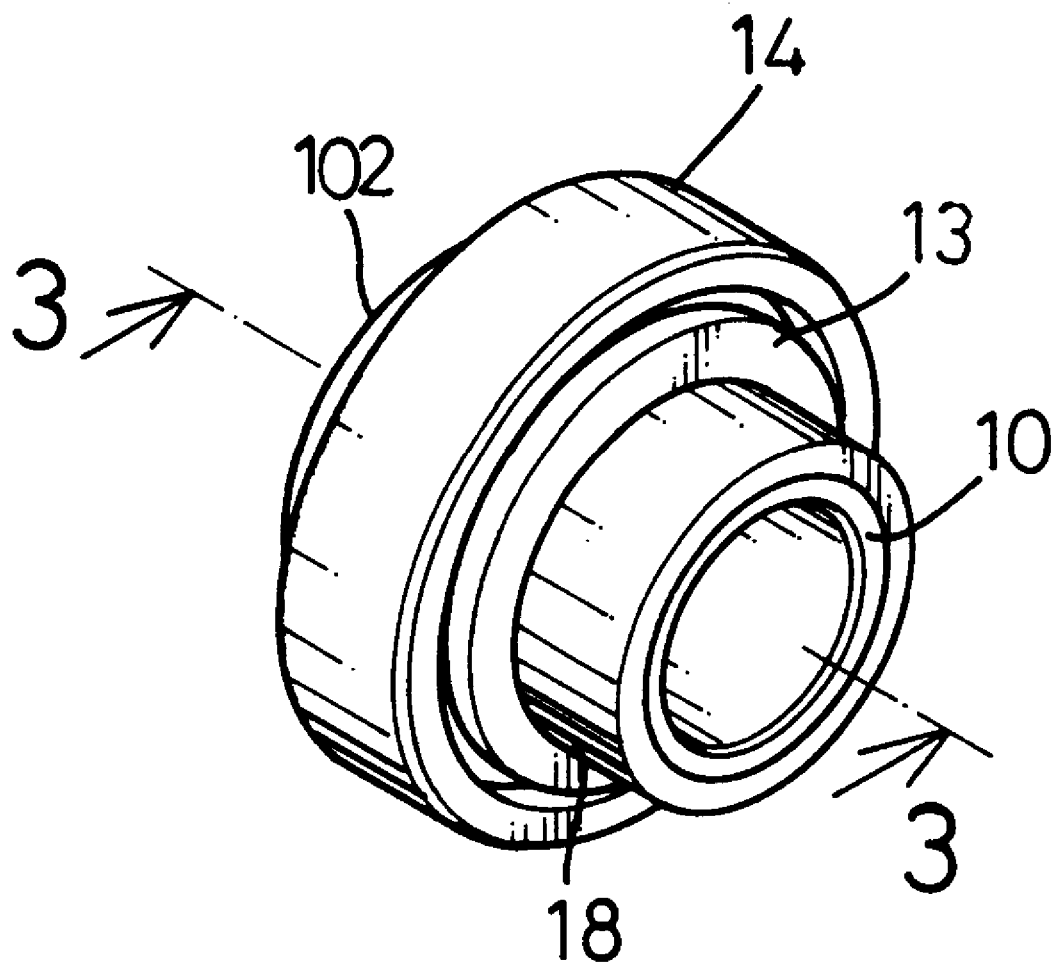
FIG. 1 is a perspective view of a bearing assembly with one row of balls in accordance with the present invention.
Figure 2:
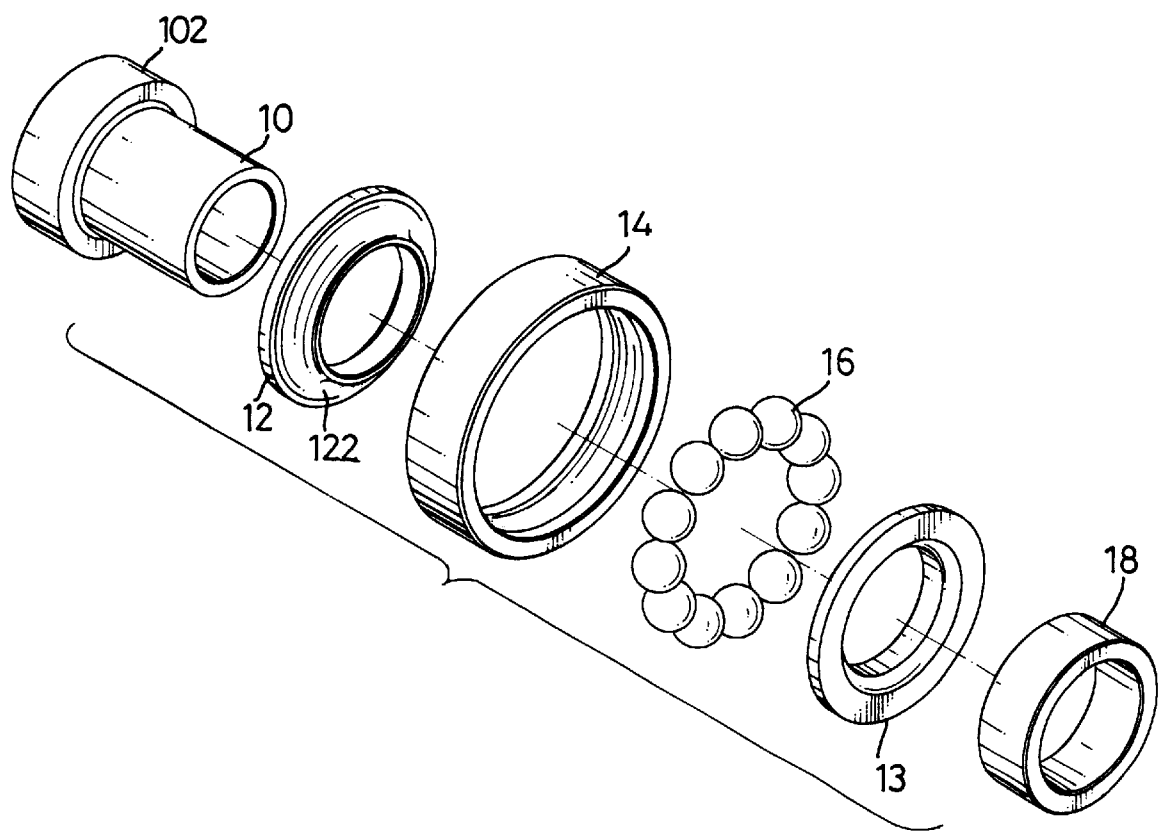
FIG. 2 is an exploded perspective view of the bearing assembly in FIG. 1.
Figure 3:
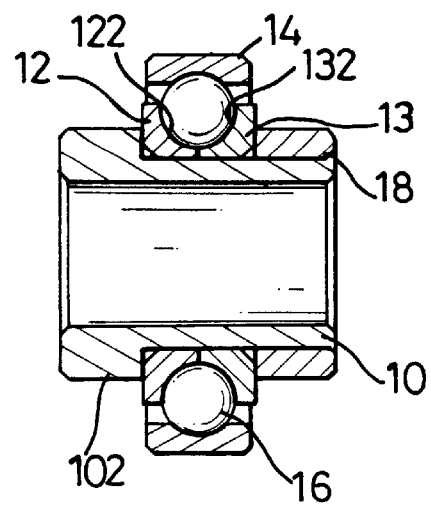
FIG. 3 is a cross sectional plan view of the bearing assembly in FIG. 1.

Referring to FIGS. 1–3, the bearing assembly in accordance with the present invention comprises a shaft tube (10), a bearing housing, bearing balls (16) and a securing collar (18). A pair of annular bearing covers (12, 13) for each row of bearing balls (16) is press fit on the outer periphery of the shaft tube (10). A concave surface (122, 132) is defined in the facing side of each of the bearing covers (12, 13). A row of balls (16) is received between the concave surfaces (122, 132) of the pair of bearing covers (12, 13). A race (14) with a concave inner surface corresponding to the curvature of the bearing balls (16) is arranged around the row of balls (16), such that the race (14) can rotate relative to the shaft tube (10) and the pair of bearing covers (12, 13) and decrease the friction between the rotating and stationary members.

In addition, an enlarged positioning end (102) with a diameter larger than that of the shaft tube (10) is formed on one end of the shaft to abut one of the bearing covers (12), and a securing collar (18) is pressed onto the other end of the shaft tube (10) to abut the other bearing cover (13). The bearing covers (12, 13) are more securely mounted on the shaft tube (10) and rotate together.

Figure 5:
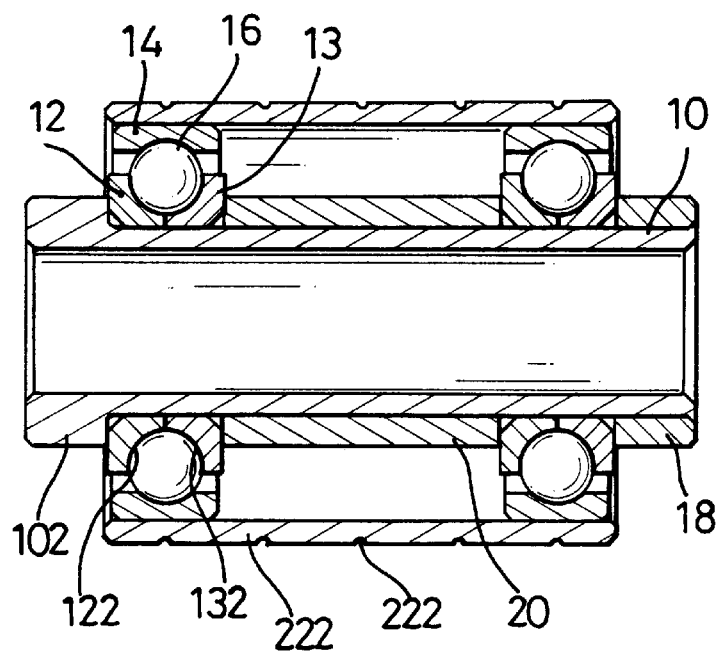
FIG. 5 is a cross sectional plan view of the bearing assembly in FIG. 4.
Figure 4:
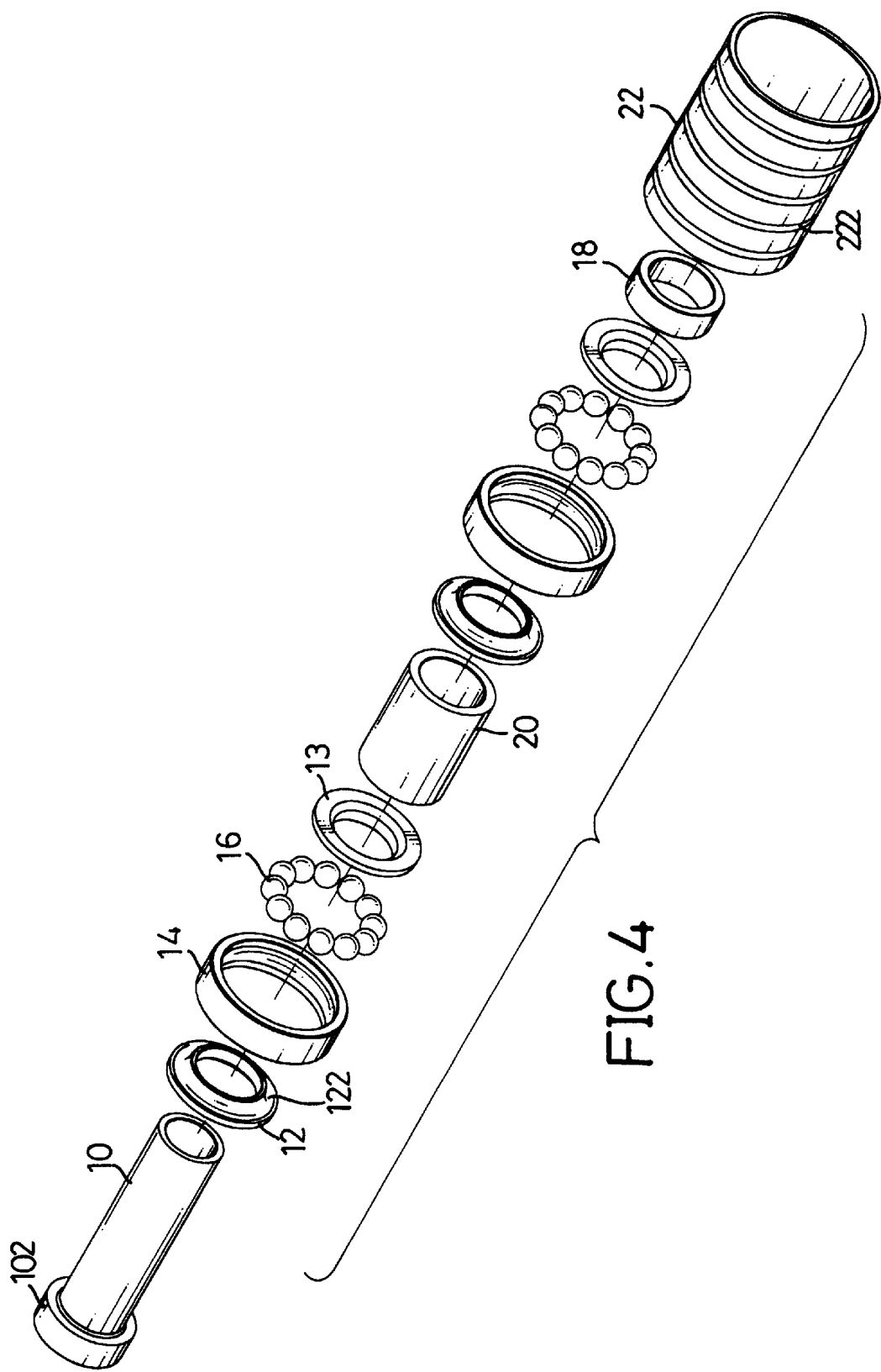
FIG. 4 is an exploded perspective view of a bearing assembly with two rows of balls in accordance with the present invention.
Figure 8:
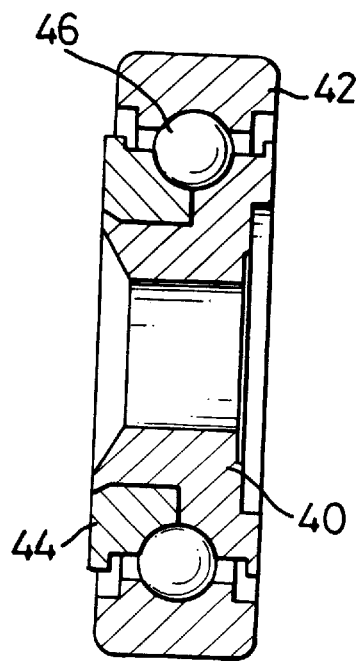
FIG. 8 is a cross sectional plan view of a bearing with one row of balls in accordance with the prior art.
Figure 9:
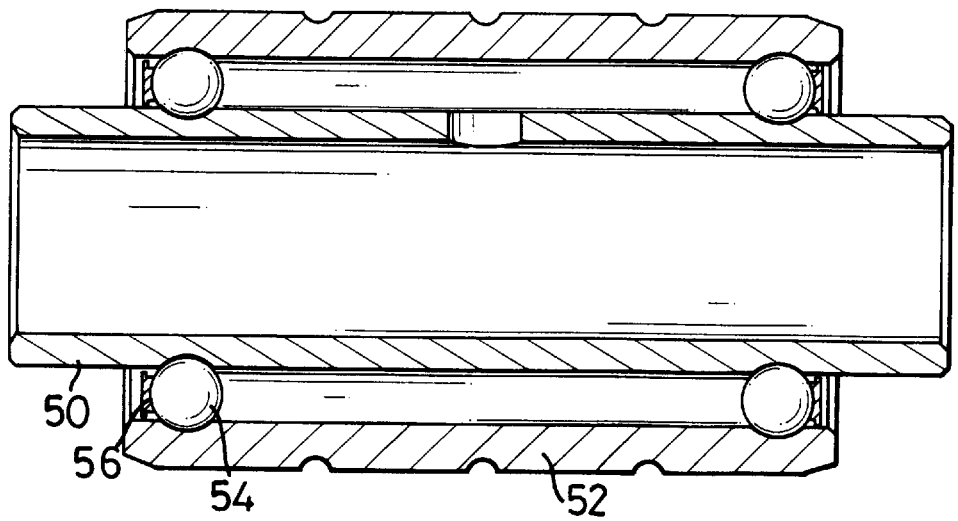
FIG. 9 is a cross sectional plan view of a bearing with two rows of balls in accordance with the prior art.

Referring to FIGS. 4 and 5, two pairs of bearing covers (12, 13) are mounted on the shaft tube (10), and each pair of bearing covers (12, 13) has one row of balls (16) held between the pair of covers (12, 13). A spacer collar (20) is mounted on the shaft tube (10) between the two pairs of collars (12, 13) to maintain their separation from each other. With such an arrangement, the bearing assembly can bear a load better than that of the conventional bearing (shown in FIG. 8) with a single row of balls. In addition, because the shaft tube (10), the bearing covers (12, 13), the race (14), the securing collar (18) and the spacer collar (20) are tubular or annular members with a simple shape, the efficiency of manufacturing and assembling the bearing assembly is improved.

Figure 6:
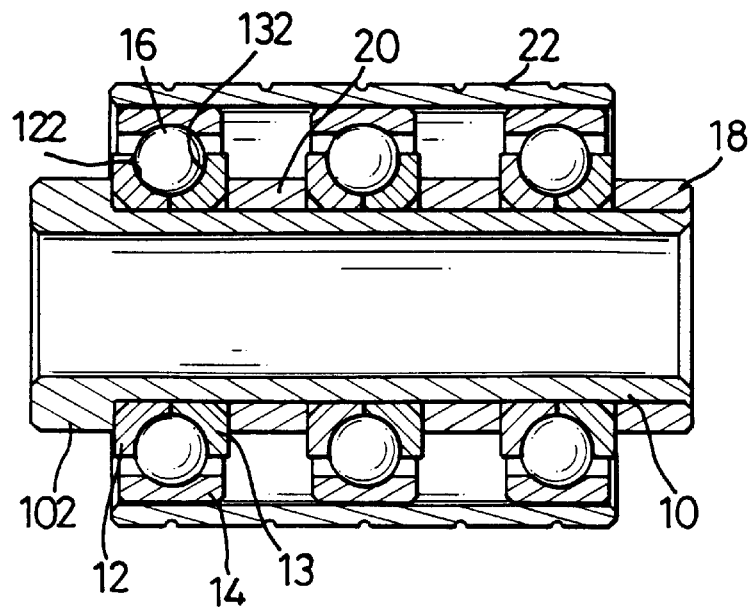
FIG. 6 is a cross sectional plan view of an embodiment of a bearing with multiple rows of balls in accordance with the present invention.
Figure 7:
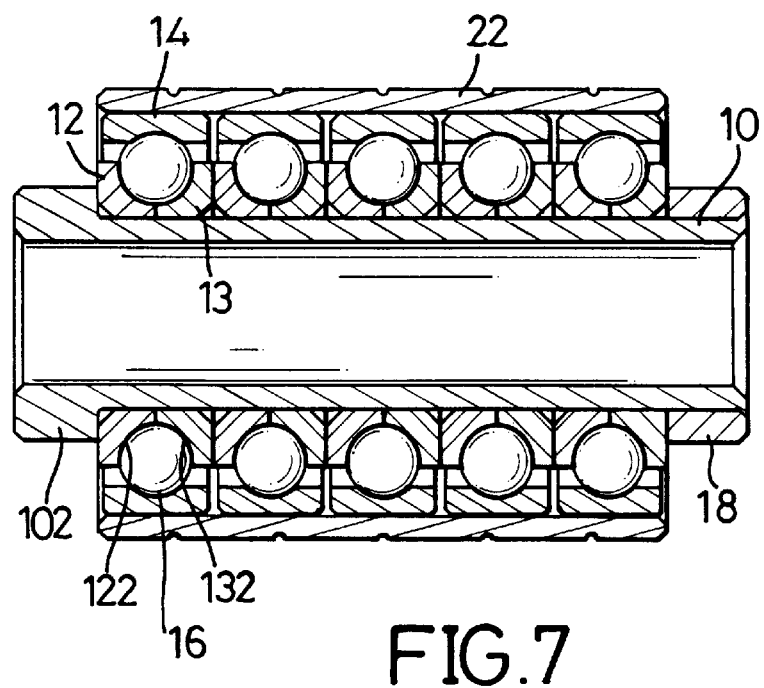
FIG. 7 is a cross sectional plan view of another embodiment of a bearing with multiple rows of balls in accordance with the present invention.

With reference to FIG. 6, another embodiment of a bearing assembly in accordance with the present invention has multiple pairs of bearing covers (12, 13) and a row of bearing balls (14) between each pair of covers (12, 13). A spacer collar (20) is arranged between adjacent pairs of bearing covers (12, 13). With reference to FIG. 7, another embodiment has the adjacent pairs of bearing covers (12, 13) abutting each other. Consequently, the bearing assembly can be arranged with multiple rows of balls (16) so as to improve the ability to bear a huge load.

In addition, a sleeve (22) is mounted on the outer periphery of all of the races (14), such that all of the races (14) can rotate relative to the shaft tube (10) simultaneously. Furthermore, multiple recesses (222) are defined in the outer periphery of the sleeve (22) to improve the bond between the sleeve (22) and the member to which the sleeve (22) is mounted.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bearing assembly comprising:

a shaft tube;

at least two pairs of bearing covers pressed onto said shaft tube, a concave surface formed on a face of each of the bearing covers, a row of balls received between the pairs of bearing covers, a race arranged around each row of balls between each said pair of bearing covers;

a sleeve securely mounted on the outer periphery of all of said races; and multiple recesses defined on the outer periphery of said sleeve;

wherein said concave surface of each pair of bearing covers corresponds to each other.

2. The bearing assembly as claimed in claim 1, wherein a spacer collar mounted on said shaft tube is located between adjacent pairs of bearing covers.

* * * * *